(12) United States Patent
McPherson et al.

(10) Patent No.: US 9,494,227 B2
(45) Date of Patent: Nov. 15, 2016

(54) POWER TAKE-OFF HAVING REDUCED GEAR NOISE

(71) Applicant: Parker-Hannifin Corporation, Cleveland, OH (US)

(72) Inventors: Robert McPherson, Olive Branch, MS (US); Greg Friend, Collierville, TN (US); John William Burrell, Olive Branch, MS (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 0 days.

(21) Appl. No.: 14/765,912

(22) PCT Filed: Feb. 7, 2014

(86) PCT No.: PCT/US2014/015242
§ 371 (c)(1),
(2) Date: Aug. 5, 2015

(87) PCT Pub. No.: WO2014/124221
PCT Pub. Date: Aug. 14, 2014

(65) Prior Publication Data
US 2015/0362058 A1 Dec. 17, 2015

Related U.S. Application Data

(60) Provisional application No. 61/762,382, filed on Feb. 8, 2013.

(51) Int. Cl.
*B60K 17/28* (2006.01)
*F16H 57/00* (2012.01)
*B60K 25/00* (2006.01)

(52) U.S. Cl.
CPC ........... *F16H 57/0006* (2013.01); *B60K 17/28* (2013.01); *B60K 25/00* (2013.01); *B60Y 2300/20* (2013.01); *B60Y 2306/09* (2013.01)

(58) Field of Classification Search
CPC .............. F16H 57/0006; B60K 17/28; B60Y 2300/20; B60Y 2306/09
See application file for complete search history.

(56) References Cited

U.S. PATENT DOCUMENTS 2,896,466 A 7/1959 Wiseman
4,793,200 A 12/1988 McDonald
(Continued)

FOREIGN PATENT DOCUMENTS

JP 2006103634 A 4/2006
KR 100551082 B1 2/2006

OTHER PUBLICATIONS

PCT International Search Report, Application No. PCT/US2014/015242, dated Nov. 20, 2014.
(Continued)

*Primary Examiner* — Drew Brown
(74) *Attorney, Agent, or Firm* — MacMillan, Sobanski & Todd, LLC

(57) ABSTRACT

A power take-off that significantly reduces the amount of undesirable noise that is transmitted therethrough during operation includes a housing, an input mechanism, and an output mechanism. The input mechanism is disposed within the housing and is adapted to be connected to a source of rotational energy. The output mechanism is also disposed within the housing and is adapted to be connected to a driven device. The output mechanism is adapted to be rotatably driven by the input mechanism. At least one of the input mechanism and the output mechanism includes a shaft having at least one portion that is supported on the housing by a vibration damping material.

21 Claims, 4 Drawing Sheets

(56) References Cited

U.S. PATENT DOCUMENTS

| | | | |
|---|---|---|---|
| 4,796,741 A | 1/1989 | Loeffler | |
| 5,062,721 A | 11/1991 | Chiba | |
| 5,219,273 A | 6/1993 | Chang | |
| 5,228,355 A * | 7/1993 | Smith | B60K 17/28 184/6.12 |
| 5,542,306 A * | 8/1996 | Fernandez | F16D 65/84 188/264 E |
| 6,073,502 A * | 6/2000 | Wallace | B60K 17/28 192/69.9 |
| 6,142,274 A * | 11/2000 | Warner | B60K 17/28 192/12 C |
| 6,224,289 B1 | 5/2001 | Redd et al. | |
| 6,260,682 B1 * | 7/2001 | Rang | B60K 17/28 192/70.19 |
| 6,322,466 B1 | 11/2001 | Eidloth | |
| 6,497,313 B1 * | 12/2002 | Blalock | B60K 17/28 192/18 A |
| 6,886,672 B2 * | 5/2005 | Matufuji | B60K 17/28 192/12 C |
| 6,962,093 B2 | 11/2005 | Warner | |
| 7,007,565 B2 * | 3/2006 | Allen | F16H 55/18 74/333 |
| 7,070,036 B2 * | 7/2006 | Fernandez | B60K 17/28 192/109 R |
| 7,159,701 B2 * | 1/2007 | Graves | F16D 59/02 192/12 C |
| 7,673,534 B2 * | 3/2010 | Prampolini | F16H 55/18 74/15.86 |
| 2003/0145666 A1 * | 8/2003 | Warner | B60K 17/28 74/11 |
| 2008/0148883 A1 | 6/2008 | Prampolini | |
| 2011/0162466 A1 | 7/2011 | Hillyer et al. | |
| 2012/0042743 A1 | 2/2012 | Hunold et al. | |

OTHER PUBLICATIONS

European Extended Search Report, Application No. EP 14749640.0, dated Aug. 24, 2016.

* cited by examiner

POWER TAKE-OFF HAVING REDUCED GEAR NOISE

CROSS-REFERENCE TO RELATED APPLICATIONS

This application is the national stage of International Application No. PCT/US2014/015242 filed Feb. 7, 2014, which claims the benefit of U.S. Provisional Application No. 61/762,382, filed Feb. 8, 2013, the disclosures of which are both incorporated herein by reference.

BACKGROUND OF THE INVENTION

This invention relates in general to power take-offs for selectively providing rotational energy from a source of rotational energy to a driven accessory. In particular, this invention relates to an improved structure for such a power take-off that significantly reduces the amount of undesirable noise that is transmitted through the power take-off during operation.

A power take-off is a well known mechanical device that is often used in conjunction with a source of rotational energy, such as a vehicle engine or transmission, to provide rotational energy to a driven accessory, such as a hydraulic pump that is supported on the vehicle. For example, power take-offs are commonly used on industrial and agricultural vehicles to provide rotational energy to hydraulic pumps that, in turn, are used to operate hydraulically driven accessories such as plows, trash compactors, lifting mechanisms, winches, and the like. The power take-off provides a simple, inexpensive, and convenient means for supplying energy from the source of rotational energy to the hydraulic pump that, in turn, provides relatively high pressure fluid to operate the driven accessory.

A typical power take-off includes an input mechanism and an output mechanism. The input mechanism of the power take-off is adapted to be connected to the source of rotational energy so as to be rotatably driven whenever the source of rotational energy is operated. The output mechanism of the power take-off is adapted to be connected to the rotatably driven accessory. In some instances, the input mechanism of the power take-off is directly connected to the output mechanism such that the driven accessory is rotatably driven whenever the source of rotational energy is operated. In other instances, a clutch assembly is provided between the input mechanism and the output mechanism such that the driven accessory is selectively rotatably driven only when the source of rotational energy is operated and the clutch assembly is engaged.

When a typical power take-off is operated, however, it often transmits an undesirable amount of noise therethrough from the source of rotational energy to the ambient environment. Such noise usually results, at least in part, from torsional vibrations that are generated from the vehicle engine and transmitted through the transmission to the power take-off. It has been found that such torsional vibrations can cause loosely meshing gears contained within the power take-off to rattle against one another as they are rotatably driven during use. Although the generation of such noise does not usually adversely affect the operation of the power take-off, it can be quite bothersome to persons that are located in the ambient environment. Thus, it would be desirable to provide an improved structure for a power take-off that significantly reduces the amount of this undesirable noise that is transmitted through the power take-off.

SUMMARY OF THE INVENTION

This invention relates to an improved structure for a power take-off that significantly reduces the amount of undesirable noise that is transmitted therethrough during operation. The power take-off includes a housing, an input mechanism, and an output mechanism. The input mechanism is disposed within the housing and is adapted to be connected to a source of rotational energy. The output mechanism is also disposed within the housing and is adapted to be connected to a driven device. The output mechanism is adapted to be rotatably driven by the input mechanism. At least one of the input mechanism and the output mechanism includes a shaft having at least one portion that is supported on the housing by a vibration damping material.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
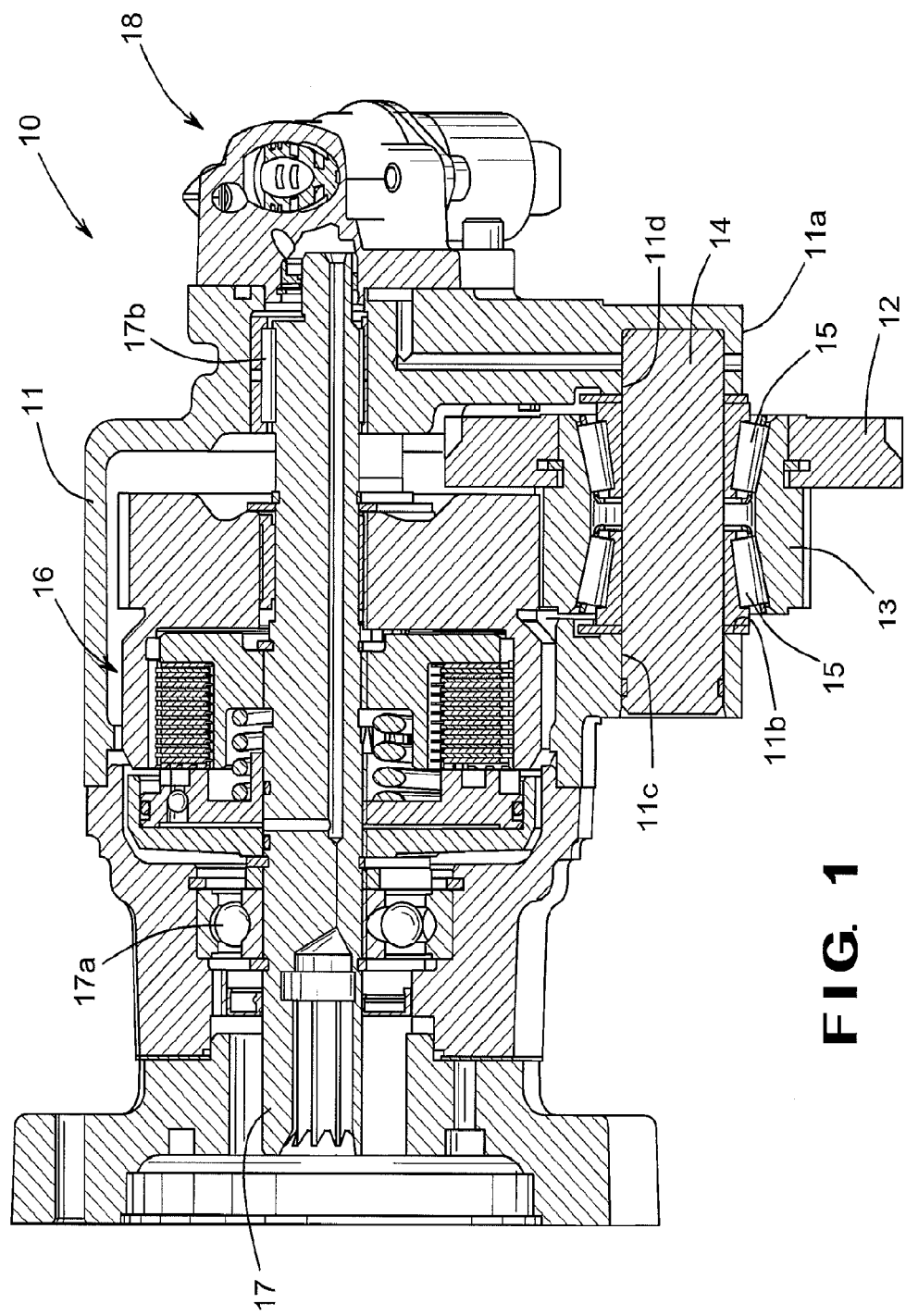
FIG. 1 is a sectional elevational view of a power take-off in accordance with a first embodiment of this invention.
Figure 2:
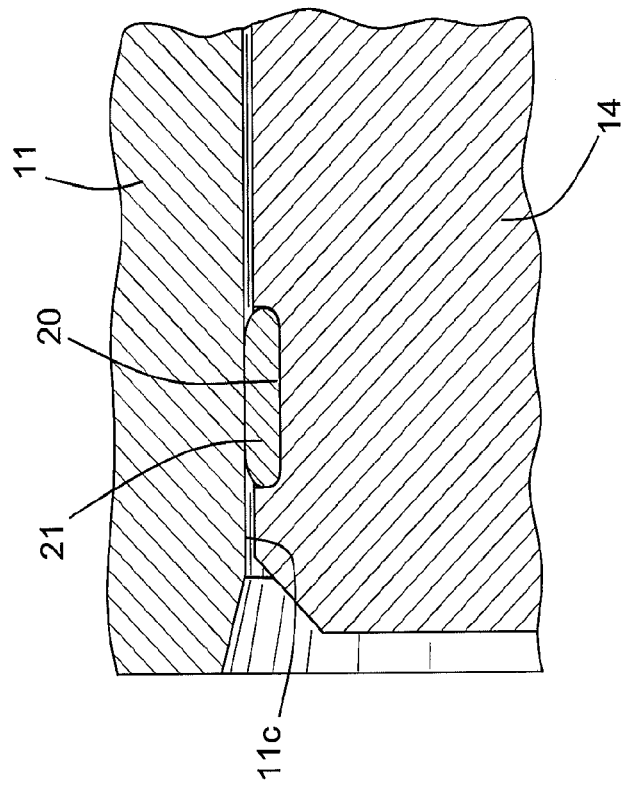
FIG. 2 is an enlarged sectional elevational view of a portion of the first embodiment of the power take-off illustrated in FIG. 1.

Referring now to the drawings, there is illustrated in FIGS. 1 and 2 a first embodiment of a power take-off, indicated generally at 10, in accordance with this invention. The illustrated power take-off 10 is intended to be representative of any structure for providing rotational energy from a source of rotational energy (not shown), such as a transmission of a vehicle, to a rotatably driven accessory (not shown), such as a hydraulic pump that is supported on the vehicle. Thus, the scope of this invention is not intended to be limited for use with the specific structure for the power take-off 10 illustrated in FIG. 1. On the contrary, as will become apparent below, this invention may be used in conjunction with any desired power take-off structure.

As will be explained in detail below, the power take-off 10 of this invention includes an input mechanism and an output mechanism. The input mechanism of the power take-off 10 is adapted to be connected to the source of rotational energy so as to be rotatably driven whenever the source of rotational energy is operated. The output mechanism of the power take-off 10 is adapted to be connected to the rotatably driven accessory.

To accomplish this, the illustrated power take-off 10 includes a hollow housing 11 having a mounting surface 11a provided thereon. An opening 11b is provided through the mounting surface 11a of the power take-off housing 11. An input gear 12 is rotatably supported within the power take-off housing 11 and includes a portion that extends outwardly through the opening 11b provided through the mounting surface 11a. The mounting surface 11a of the power take-off housing 11 is adapted to be secured (typically by a plurality of bolts) to a corresponding mounting surface (not shown) provided on the source of rotational energy, such as an engine or a transmission of a vehicle. As is well known in the art, the portion of the input gear 12 that extends through the opening 11b of the power take-off housing 11 is adapted to extend within a portion of the source of rotational energy and engage a corresponding gear (not shown) or other mechanism provided therein. Thus, the input gear 12 of the power take-off 10 is rotatably driven whenever the gear contained within the source of rotational energy is rotatably driven.

The illustrated input gear 12 is splined onto or otherwise supported on an input gear hub 13 for concurrent rotation. The input gear hub 13 is, in turn, rotatably supported on an input shaft 14 by a pair of roller bearings 15. First and second ends of the illustrated input shaft 14 are respectively (and non-rotatably) supported in first and second bores 11c and 11d provided in the power take-off housing 11. In the illustrated embodiment, the input shaft 14 and each of the first and second bores 11c and 11d are all generally cylindrical in shape, although such is not required. The specific manner in which the ends of the illustrated input shaft 14 are non-rotatably supported in the first and second bores 11c and 11d of the power take-off housing 11 will be described in detail below.

The illustrated power take-off 10 also includes a clutch assembly, indicated generally at 16, for selectively the connecting the input gear hub 13 to an output shaft 17. The output shaft 17 is, in turn, adapted to be connected to the rotatably driven accessory (not shown). The illustrated output shaft 17 is rotatably supported on the power take-off housing 11 by a pair of bearings 17a and 17b or other similar means. When the clutch assembly 16 is engaged, the input gear hub 13 is connected to the output shaft 17 for concurrent rotation. Thus, the rotatably driven accessory is rotatably driven by the source of rotational power when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational power when the clutch assembly 16 is disengaged. The specific structure and manner of operation of the clutch assembly 16 are conventional in the art and form no part of this invention. Thus, the clutch assembly 16 may be embodied as any other structure for selectively the connecting the input gear hub 13 to an output shaft 17. A conventional shifter assembly, indicated generally at 18, may be provided to selectively engage and disengage the clutch assembly 16 in a known manner.

FIG. 2 best illustrates the manner in which the first end of the illustrated input shaft 14 is non-rotatably supported in the first bore 11c of the power take-off housing 11. As shown therein, the first end of the illustrated input shaft 14 has a first groove 20 provided in an outer surface thereof. The first groove 20 defines a depth when measured in the radial direction relative to the input shaft 14. Within the first groove 20, a first damper 21 is disposed. The specific structure and composition of the first damper 21 will be described in detail below. However, the illustrated first damper 21 has a radial dimension that is somewhat larger than the radial depth of the first groove 20 provided in the input shaft 14. Thus, as shown in FIG. 2, the first damper 21 functions to maintain an annular space between the outer surface of the first end of the input shaft 14 and an inner surface of the power take-off housing 11 defined by the first bore 11c. The radial size of this annular space is typically relatively small, such as about 0.0004 inch for example, but any other desired magnitude of separation can be provided.

As discussed above, when a typical power take-off is operated, an undesirable amount of noise is often transmitted therethrough as a result (at least in part) from torsional vibrations that are generated from the vehicle engine and transmitted through the transmission to the power take-off. The creation of airborne noise occurs because the ends of the input shaft in a conventional power take-off are in direct metal-to-metal engagement with the power take-off housing. As a result, torsional vibrations from the transmission are transmitted through the meshing gears to the input shaft and other components of a conventional power take-off with little attenuation. Because of backlash or other spacing that typically exists between the meshing gears and other components contained within a conventional power take-off, an undesirable amount of noise is generated in response to the application of these torsional vibrations.

To address this, the first damper 21 of this invention is formed from a vibration damping material that reduces the amount of undesirable torsional vibrations that are transmitted therethrough from the meshing gears to the input shaft 14 and other components of the power take-off 10. The vibration damping material used to form the first damper 21 of this invention can, for example, be a conventional elastomeric material, such as rubber. However, as used herein, the term "vibration damping material" is intended to refer to any material (or combination of materials) that is effective to transmit a lesser amount of vibrations from the end of the input shaft 14 to the power take-off housing 11 than would occur if such end was in direct metal-to-metal engagement with the power take-off housing 11.

Referring back to FIG. 1, it can be seen that the second end of the illustrated input shaft 14 is non-rotatably supported in the second bore 11d of the power take-off housing 11 similarly to the first end of the input shaft 14. Thus, the second end of the illustrated input shaft 14 has a second groove provided in an outer surface thereof that defines a radial depth, and a second damper is disposed within the second groove. Similarly, the second damper has a radial dimension that is somewhat larger than the radial depth of the second groove and, therefore, functions to maintain an annular space between the outer surface of the second end of the input shaft 14 and an inner surface of the power take-off housing 11 defined by the second bore 11d. The second damper can also be formed from a vibration damping material, although the vibration damping material used to form the second damper may be different from the vibration absorbing material used to form the first damper 21. If desired, the second damper and the second groove may be omitted from the power take-off 10 such that the second end of the input shaft 14 is supported in direct metal-to-metal engagement with the power take-off housing 11.

In the illustrated embodiment, the first groove 20 is annular in shape and extends completely about the outer surface of the input shaft 14. However, the first groove 20 may be embodied otherwise if desired. For example, the first groove 20 may be embodied as a plurality of discrete groove portions that are provided about some or all of the outer surface of the input shaft 14, and the first damper 21 may be embodied as a plurality of discrete damper portions respectively disposed therein. Similarly, in the illustrated embodiment, the first damper 21 is annular in shape and extends completely throughout the extent of the first groove 20. However, the first damper 21 may also be embodied otherwise if desired. For example, the first damper 21 may extend only partially throughout the extent of the first groove 20, or a plurality of discrete first dampers 21 may be provided within the first groove 20, each of which extends only partially throughout the entire extent of the first groove 20. The second groove and the second damper may also be embodied in a similar manner, either the same or different from the first groove 20 and the first damper 21.

As shown in FIGS. 1 and 2, the first groove 20 is shown as being provided in the outer surface of the input shaft 14. However, as shown in the second embodiment of this invention illustrated in FIG. 3, the first groove 20 may be provided in the inner surface of a modified power take-off housing 11' defined by a modified first bore 11c'.

Figure 3:
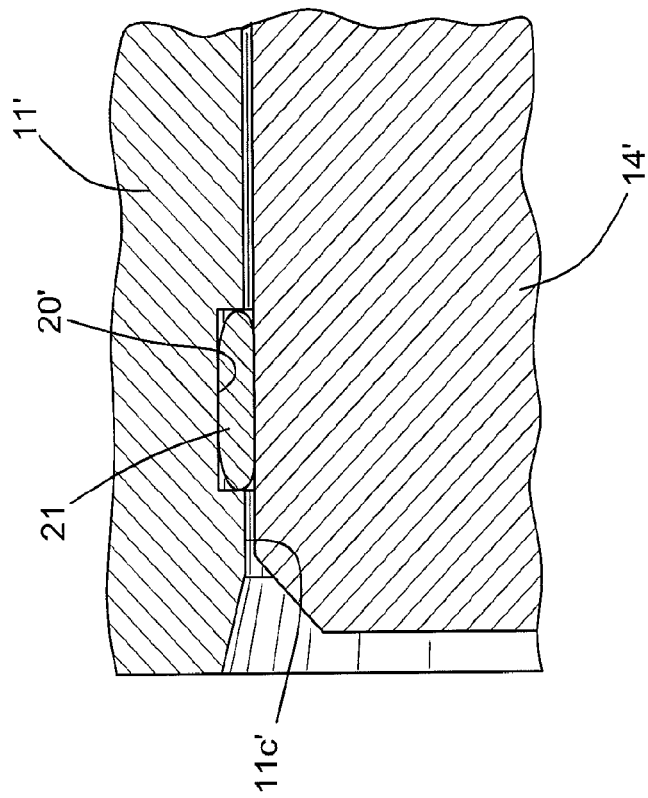
FIG. 3 is an enlarged sectional elevational view similar to FIG. 2 of a portion of a second embodiment of a power take-off in accordance with this invention.
Figure 4:
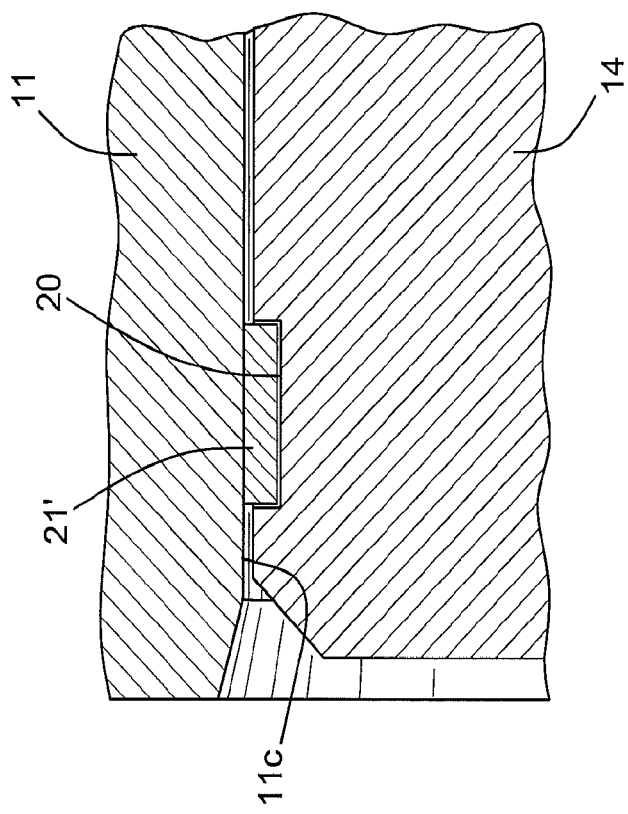
FIG. 4 is an enlarged sectional elevational view similar to FIG. 2 of a portion of a third embodiment of a power take-off in accordance with this invention.
Figure 5:
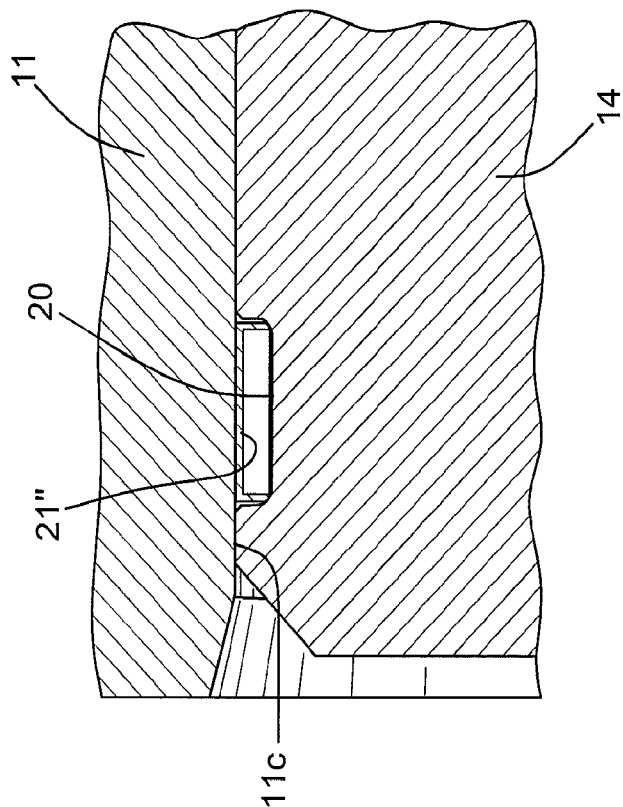
FIG. 5 is an enlarged sectional elevational view similar to FIG. 2 of a portion of a fourth embodiment of a power take-off in accordance with this invention.

Similarly, the first damper 21 is shown in FIGS. 1 through 3 as having a cross sectional shape that is generally elliptical. However, the first damper 21 may have any other desired cross sectional shape. For example, FIG. 4 illustrates a third embodiment of this invention, wherein a modified first damper 21' has a cross sectional shape that is generally rectangular. Alternatively, FIG. 5 illustrates a fourth embodiment of this invention, wherein a further modified first damper 21" has a cross sectional shape that is generally U-shaped.

Figure 6:
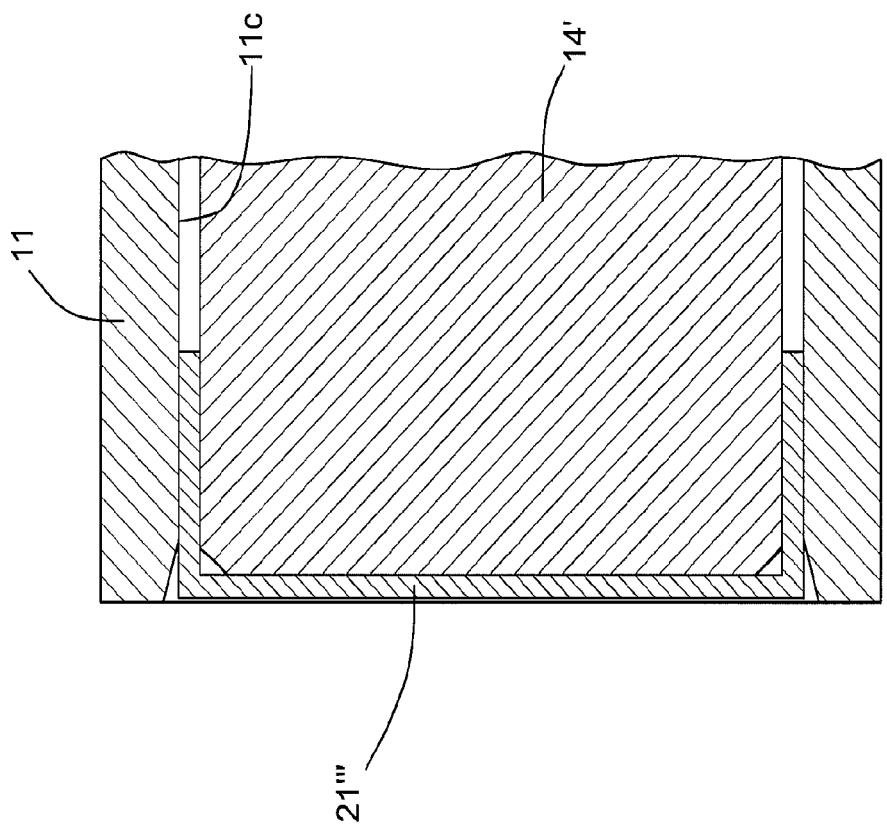
FIG. 6 is an enlarged sectional elevational view of a portion of a fifth embodiment of a power take-off in accordance with this invention.

Lastly, FIG. 6 illustrates a fifth embodiment of this invention wherein a further modified first damper 21''' is generally cup-shaped and is disposed about both the circumferentially-facing and the axially-facing portions of the end of a modified input shaft 14'. The modified input shaft 14' illustrated in FIG. 6 does not have the annular groove 20 or 20' provided therein, as shown in FIGS. 1 through 5. However, if desired, the circumferentially-facing portion of the end of the modified input shaft 14', adjacent to the axially-facing portion thereof, may be provided with a recess (not shown) within which the corresponding circumferentially-extending portion of the modified first damper 21''' is received.

The second damper of the power take-off 10 (if provided at all) may also be embodied having any of these (or other) alternative structures.

This invention has been described and illustrated in the context of the first and second dampers being provided on the input shaft 14, wherein the input gear 12 is splined onto the input gear hub 13 and the input gear hub 13 is selectively connected through the clutch assembly 16 to the output shaft 17. However, this invention contemplates that the clutch assembly 16 may, if desired, be omitted completely from the power take-off 10. In such an instance, the input gear hub 13 can be constantly connected to rotatably drive the output shaft 17, thereby causing the rotatably driven accessory to be constantly rotatably driven whenever the source of rotational power is operated.

Furthermore, it will be appreciated that this invention may alternatively (or additionally) be embodied on other shafts (not shown) provided within the power take-off 10. For example, it is known to provide the power take-off with an idler shaft as part of the input mechanism thereof. The idler shaft supports an intermediate idler gear that cooperates with both the input gear hub 13 and the output shaft 17. This invention contemplates that first and/or second dampers such as described herein may be used to support the idler shaft on the power take-off housing 11 in lieu of (or in addition to) supporting the input shaft 14 on the power take-off housing 11.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A power take-off comprising:
    a housing;
    an input mechanism disposed within the housing and adapted to be connected to the source of rotational energy; and
    an output mechanism disposed within the housing and adapted to be connected to a driven device, the output mechanism adapted to be rotatably driven by the input mechanism;
    wherein at least one of the input mechanism and the output mechanism includes a shaft having at least one portion that is supported on the housing by a vibration damping material.

2. The power take-off defined in claim 1 wherein the vibration damping material is an elastomeric material.

3. The power take-off defined in claim 1 wherein the vibration damping material is rubber.

4. The power take-off defined in claim 1 wherein the shaft is non-rotatably supported on the housing by the vibration damping material.

5. The power take-off defined in claim 1 wherein the shaft has a groove provided therein, and wherein the vibration damping material is disposed within the groove.

6. The power take-off defined in claim 1 wherein the housing has a groove provided therein, and wherein the vibration damping material is disposed within the groove.

7. The power take-off defined in claim 1 wherein the vibration damping material is generally elliptical in cross sectional shape.

8. The power take-off defined in claim 1 wherein the vibration damping material is generally rectangular in cross sectional shape.

9. The power take-off defined in claim 1 wherein the vibration damping material is generally U-shaped in cross sectional shape.

10. The power take-off defined in claim 1 wherein the vibration damping material is generally cup-shaped in cross sectional shape.

11. The power take-off defined in claim 1 wherein the vibration damping material is generally cup-shaped in cross sectional shape and is disposed about both circumferentially-facing and the axially-facing portions of an end of the shaft.

12. The power take-off defined in claim 1 wherein the shaft is an input shaft that supports an input gear that is adapted to be connected to the source of rotational energy.

13. The power take-off defined in claim 1 wherein the shaft has two portions that are each supported on the housing by respective vibration damping materials.

14. The power take-off defined in claim 1 wherein the vibration damping material maintains a space between the shaft and the housing.

15. The power take-off defined in claim 1 wherein the portion of the shaft is supported on the housing in a non-rotatable and a non-axially movable manner by the vibration damping material.

16. A power take-off comprising:

a housing including a first bore and a second bore;

an input shaft having a first portion that is supported in the first bore of the housing by a vibration damping material and a second portion that is supported in the second bore of the housing;

an input gear rotatably supported on the input shaft and adapted to be connected to the source of rotational energy; and an output mechanism disposed within the housing and adapted to be connected to a driven device, the output mechanism adapted to be rotatably driven by the input gear.

17. The power take-off defined in claim 16 wherein the input shaft is non-rotatable and non-axially movable relative to the housing.

18. The power take-off defined in claim 15 wherein the vibration damping material is generally elliptical in cross sectional shape.

19. The power take-off defined in claim 15 wherein the vibration damping material is generally U-shaped in cross sectional shape.

20. The power take-off defined in claim 15 wherein the vibration damping material is generally cup-shaped in cross sectional shape.

21. The power take-off defined in claim 15 wherein the vibration damping material is generally cup-shaped in cross sectional shape and is disposed about both circumferentially-facing and the axially-facing portions of an end of the input shaft.

* * * * *